(12) United States Patent
Long

(10) Patent No.: US 8,800,663 B2
(45) Date of Patent: Aug. 12, 2014

(54) LEADSCREW AND SUB-SEA CONNECTOR

(75) Inventor: Nicholas Long, Pontardawe (GB)

(73) Assignee: Vector International Limited, Port Talbot (GB)

( * ) Notice: Subject to any disclaimer, the term of this patent is extended or adjusted under 35 U.S.C. 154(b) by 453 days.

(21) Appl. No.: 12/971,471

(22) Filed: Dec. 17, 2010

(65) Prior Publication Data

US 2011/0241336 A1 Oct. 6, 2011

(30) Foreign Application Priority Data

Dec. 18, 2009 (GB) .................................. 0922132.6

(51) Int. Cl.
*E21B 41/04* (2006.01)

(52) U.S. Cl.
USPC ........... 166/338; 166/360; 166/84.2; 285/410

(58) Field of Classification Search
USPC ........ 166/338, 341, 351, 360, 378, 379, 85.1, 166/84.2; 285/32, 35, 145.1, 302, 420, 900, 285/410, 411, 920
See application file for complete search history.

(56) References Cited

U.S. PATENT DOCUMENTS

| | | | | |
|---|---|---|---|---|
| 2,448,232 A | * | 8/1948 | Muse | 285/11 |
| 3,229,656 A | * | 1/1966 | Bodey | 114/268 |
| 3,231,297 A | * | 1/1966 | Watts et al. | 285/24 |
| 3,233,314 A | * | 2/1966 | Watkins et al. | 405/158 |
| 4,902,046 A | * | 2/1990 | Maloberti | 285/34 |
| 5,108,133 A | * | 4/1992 | Maloberti | 285/34 |
| 5,513,228 A | * | 4/1996 | Malmasson | 376/203 |
| 6,003,548 A | * | 12/1999 | Muchow | 137/614.05 |
| 6,017,065 A | * | 1/2000 | Helles.o slashed.e | 285/25 |
| 6,499,773 B1 | * | 12/2002 | Ostergaard | 285/408 |
| 6,997,645 B2 | * | 2/2006 | von Trepka et al. | 405/170 |
| 7,086,807 B2 | * | 8/2006 | Mackinnon | 405/170 |
| 7,112,009 B2 | * | 9/2006 | Mackinnon | 405/173 |
| 7,380,835 B2 | * | 6/2008 | McCoy et al. | 285/24 |
| 7,891,713 B2 | * | 2/2011 | Bekkevold | 285/406 |
| 8,011,434 B2 | * | 9/2011 | Cosgrove et al. | 166/341 |
| 8,020,623 B2 | * | 9/2011 | Parks et al. | 166/341 |
| 8,057,126 B2 | * | 11/2011 | MøGedal et al. | 405/170 |
| 8,196,971 B2 | * | 6/2012 | Hansen | 285/367 |
| 2006/0197342 A1 | * | 9/2006 | Yen | 285/298 |
| 2008/0141803 A1 | * | 6/2008 | Christensen et al. | 74/89.4 |

FOREIGN PATENT DOCUMENTS

GB 1574256 A 9/1980
WO WO2007031603 A1 3/2007

* cited by examiner

*Primary Examiner* — Matthew Buck
(74) *Attorney, Agent, or Firm* — Gordon & Jacobson, PC

(57) ABSTRACT

A leadscrew has first and second housing portions—which slide telescopically together. A shaft having an externally threaded portion screws into a complimentary internal threaded portion in the first housing portion, the shaft extending out of the second housing portion at a point where a fluid tight seal is provided_between the shaft and the other of the housings and allows rotation during a screwing action. The second housing includes a flanged end to which a ROV drive bucket is bolted. The shaft has a squared end so that it can be rotated relative to the bucket by the ROV. O-rings provide fluid tight seals between the two housing portions, between the flanged end and bucket, and between the shaft and bucket. A deep sea version incorporating oil bath the pressure of which is equalised to that of the surrounding sea so that O-rings do not have to withstand large pressure differences.

8 Claims, 6 Drawing Sheets

LEADSCREW AND SUB-SEA CONNECTOR

CROSS-REFERENCE TO RELATED APPLICATIONS

This application claims priority from United Kingdom patent application GB0922132.6, filed on Dec. 18, 2009, which is hereby incorporated by reference herein in its entirety.

BACKGROUND OF THE INVENTION

A leadscrew is a screw designed to translate a radial motion into a linear motion. Leadscrews when used in a hostile environment such as a sub-sea location tend to erode or become encrusted with matter leading to their unsatisfactory operation.

Leadscrews in which an externally threaded portion is adjustably screwed into a fixed length housing are well known. The housing however does not fully protect the externally threaded portion from the environment over its full range of adjustment.

SUMMARY OF THE INVENTION

The prime object of the present invention is to provide a leadscrew in which inter engaging adjustment threads thereof are totally enclosed in a protective housing or sleeve over its full range of adjustment.

According to a first aspect, the present invention provides a leadscrew comprising; first and second housing portions which slide telescopically together; first seal means providing a fluid seal between said two housing portions; a shaft having an externally threaded portion adapted to screw into a complimentary internal threaded portion in one housing portion, said shaft extending out of the other housing portion; and at least one further seal means providing a fluid seal between the shaft and said other housing portion.

Preferably a torque link to prevent relative rotation between said first housing portion and said second housing portion is provided. This could be incorporated in the leadscrew by providing the housing portions with mating members of non circular cross section, (e.g. by incorporating splines and grooves) so that one housing portion cannot rotate relative to the other. Alternatively and more preferably a connector or other mechanical assembly in which the leadscrew is used, provides a torque link between said two housing portions.

A second object of the present invention is to provide leadscrew meeting the first object incorporated in a sub-sea connector or other mechanical assembly which in use provides a torque link between said two housing portions.

According to a second aspect, the present invention provides a sub-sea clamp connector incorporating a leadscrew in accordance with the first object.

The present invention thus provides a leadscrew enclosed in a protective housing or sleeve and a sub-sea clamp connector incorporating the same.

The invention will now be described solely by way of example and with reference to the accompanying drawings.

DETAILED DESCRIPTION OF THE PREFERRED EMBODIMENTS

Figure 1:
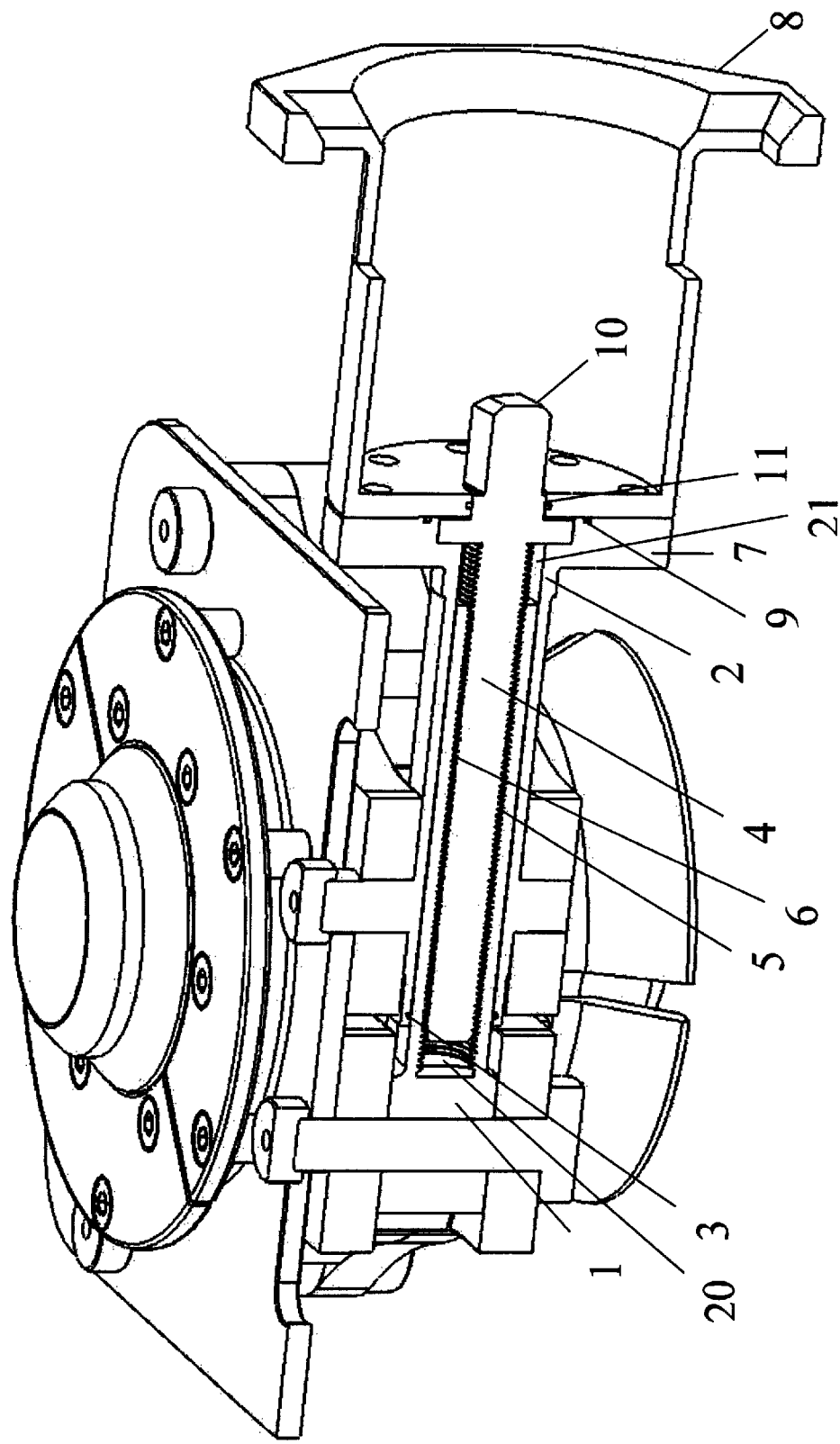
FIG. 1 shows an isometric part cross sectional view of a shallow water version of a sub-sea clamp connector in fully closed position.
Figure 2:
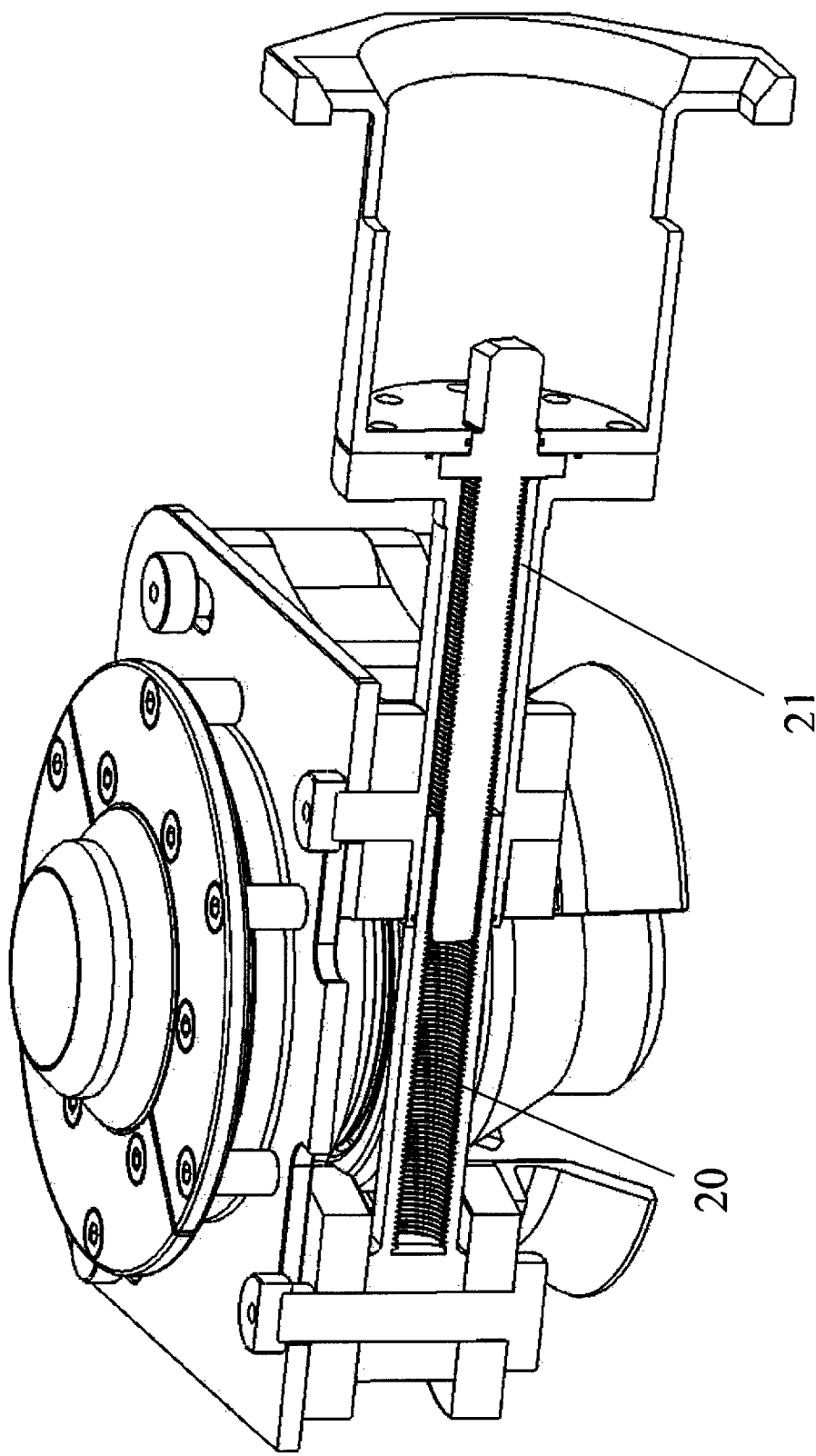
FIG. 2 shows an isometric part cross sectional view of the shallow water version in fully open position.
Figure 3:
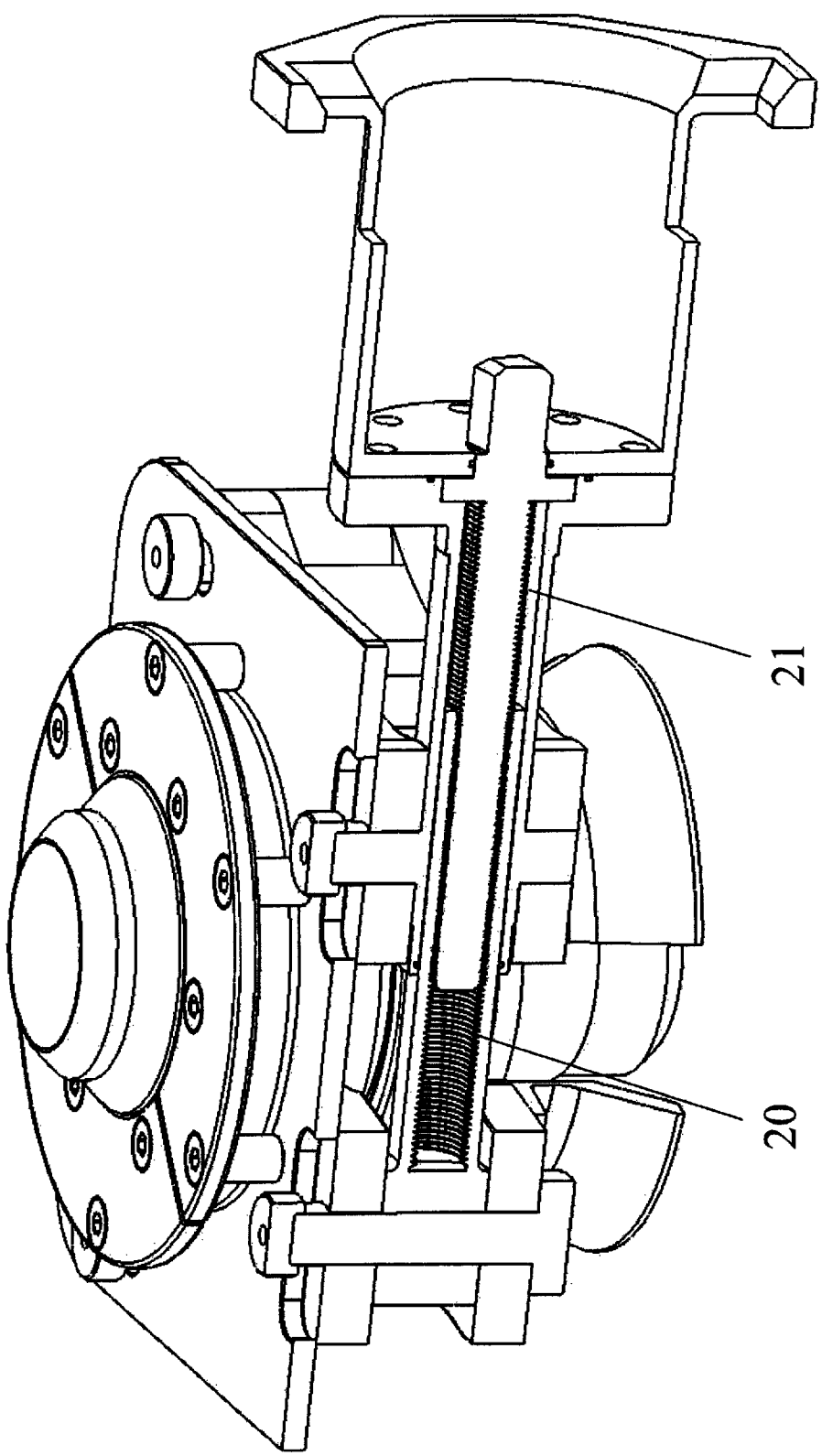
FIG. 3 shows an isometric part cross sectional view of the shallow water version in partially open position.

FIGS. 1 to 3 show the shallow water version in fully closed, fully open and partially open positions respectively.

As shown a leadscrew comprising; first and second housing portions 1 and 2 which slide telescopically together. A first seal means in the form of a first "O" ring 3 provides a fluid tight seal between said two housing portions while allowing telescopic action therebetween. A shaft 4 having an externally threaded portion 5 is adapted to screw into a complimentary internal threaded portion 6 in said first housing portion 1, said shaft extending out of the second housing portion 2 at a point where at least one further seal means provides a fluid tight seal between the shaft and the second housing portion and allows rotation during a screwing action. The second housing portion includes a flanged end 7 to which a ROV bucket drive 8 is bolted. A second "O" ring 9 provides a fluid tight seal between the flanged end 7 and the bucket 8. The shaft has a squared end 10 so that it can be rotated relative to the bucket by the ROV and a third "O" ring 11 provides a fluid tight seal between the shaft and the bucket 8 while allowing said rotation. Thus a second seal means provides a fluid tight seal between the second housing portion and a part of a drive assembly and a third seal means provides a fluid tight seal between said part and said shaft.

The leadscrew in the shallow water version incorporates spaces 20 and 21 which contain some lubrication oil but in which air trapped therein is compressed to different degrees in different positions. The depth to which this version will satisfactorily operate is limited by the pressure differences the "O" rings can withstand.

Figure 4:
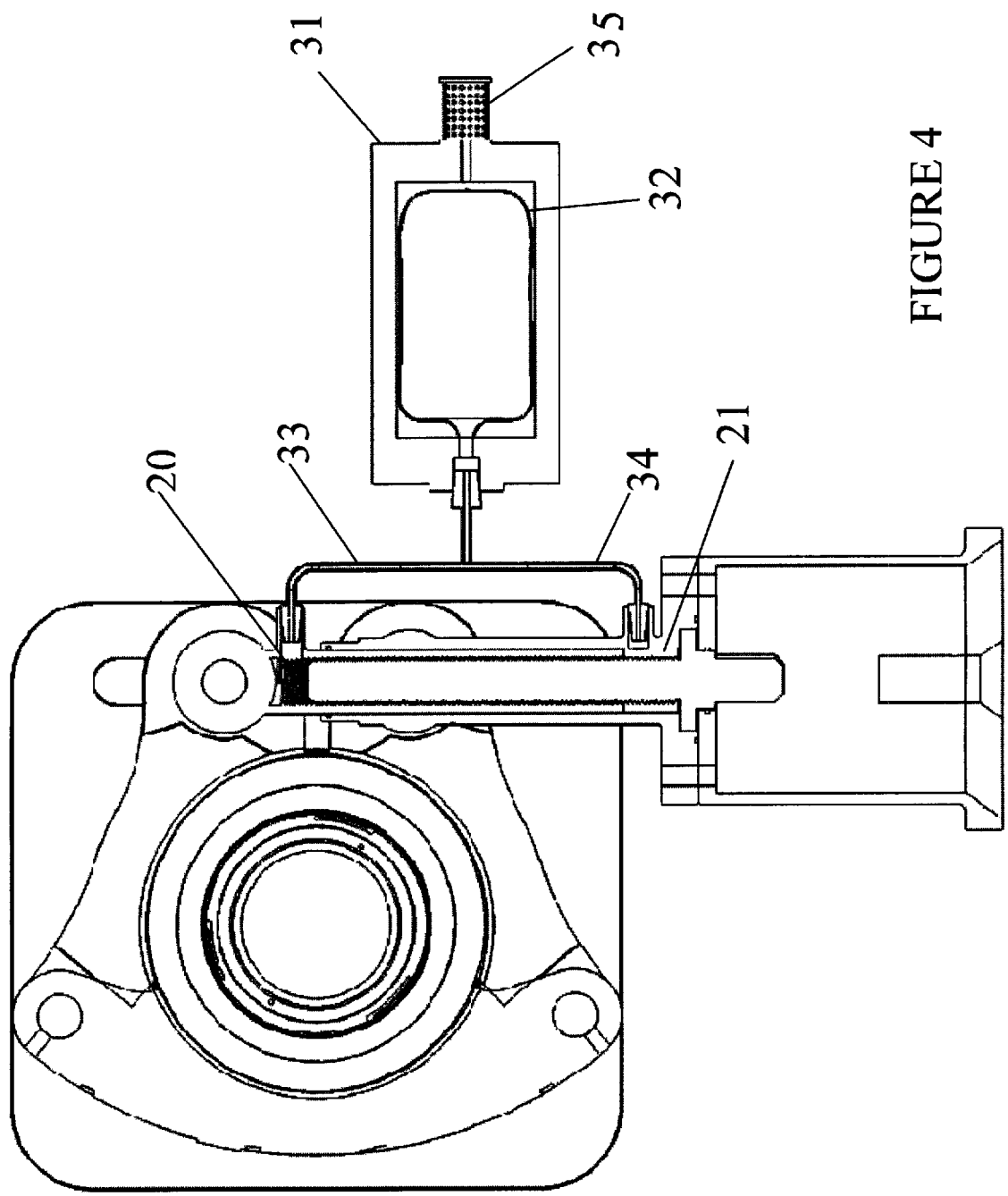
FIG. 4 shows a bottom sectional view for deep sea clamp connector incorporating a pressure compensator.
Figure 5:
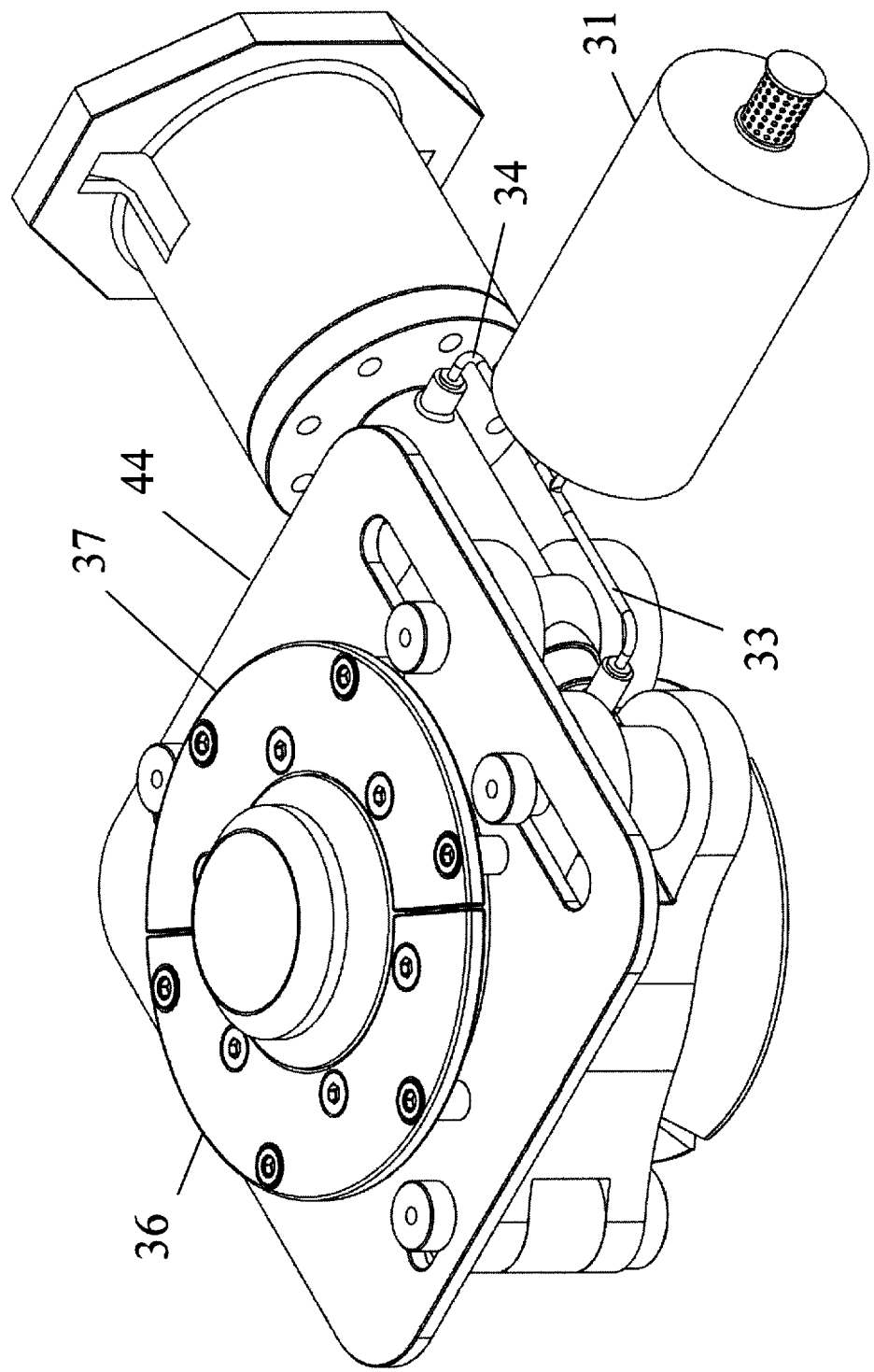
FIG. 5 shows an isometric top view of the deep sea version.
Figure 6:
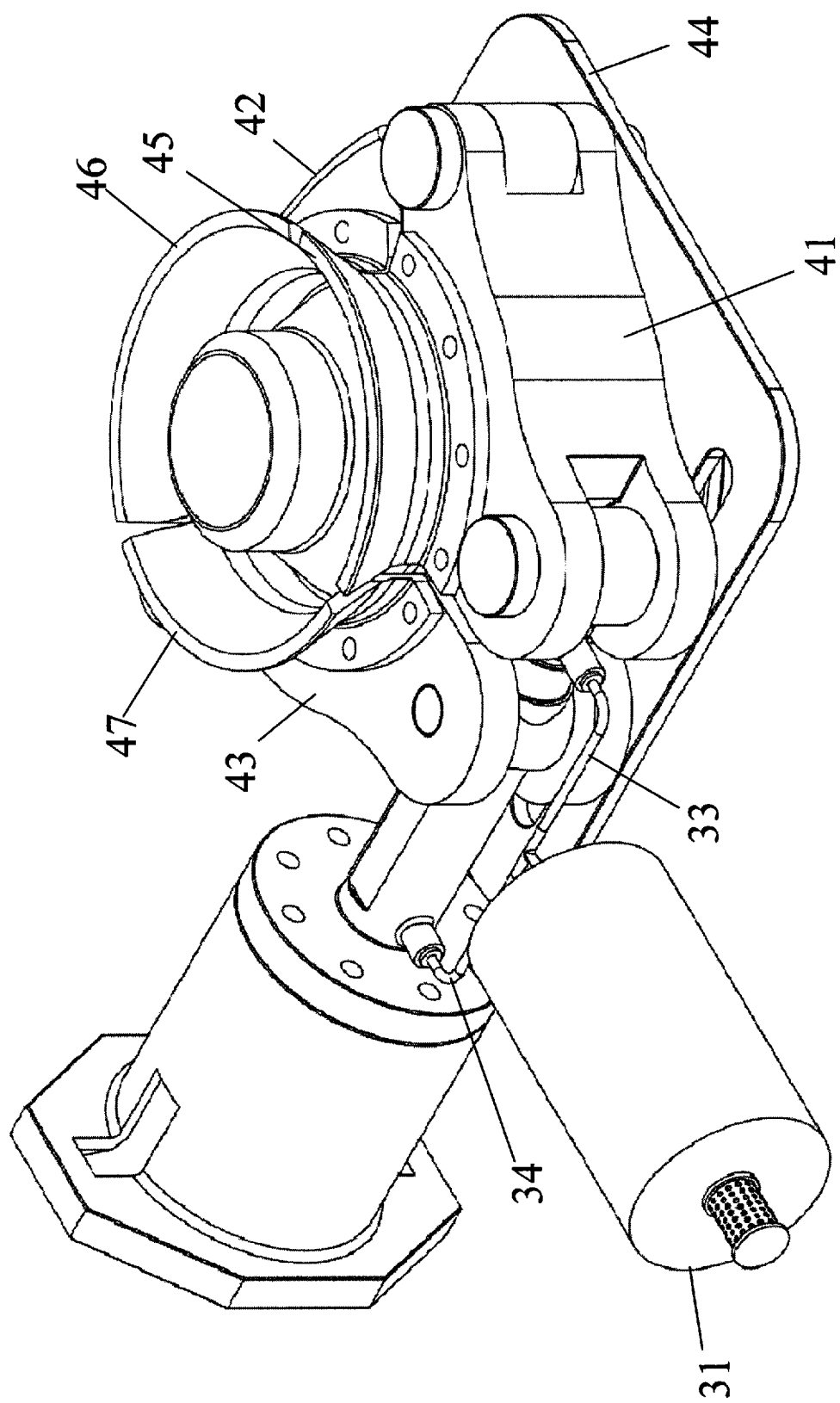
FIG. 6 shows an isometric bottom view of the deep sea version.

FIGS. 4 to 6 show a deep sea version in which a pressure compensator 31 is added.

The pressure compensator comprises a flexible expansion envelope 32 connected by pipes 33 and 34 to the spaces 20 and 21. The envelope 32, pipes and spaces are filled with oil so as to provide an oil bath with substantially no air spaces therein. A vent 35 in the compensator allows the pressure in the oil bath to equalise with the pressure in the sea at the working depth. In consequence the pressures in spaces 20 and 21 are both equal to the surrounding sea pressure and the "O" rings 3, 9 and 11 have substantially no pressure differences to cope with allowing deep sea operation.

As can best be seen in FIGS. 5 and 6 the clamp connector comprises three or more pivotally interconnected clamping sectors 41, 42 and 43 mounted in known fashion by pin and slot connections on a single guide plate 44. To facilitate alignment during installation a guide funnel comprising a corresponding number of funnel segments 45, 46 and 47 each bolted onto or otherwise attached to its corresponding clamping sector is provided. Thus the clamp connector comprises three or more pivotally interconnected clamping sectors and a corresponding number of funnel segments each attached to its corresponding clamping sector.

The invention claimed is:

1. A leadscrew comprising:
   first and second housing portions in which said first housing portion slides telescopically within said second housing portion;
   first seal means providing a fluid seal between said first and second housing portions;
   a shaft having an externally threaded portion adapted to screw into a complimentary internal threaded portion in said first housing portion, said shaft extending out of said second housing portion and having an external engagement portion for external rotation of said shaft; and
   at least one further seal means providing a fluid seal between said shaft and said second housing portion,
   wherein said further seal means comprises a second seal means providing a fluid tight seal between said second housing portion and a part of a drive assembly and a third seal means providing a fluid tight seal between said part and said shaft.

2. A sub-sea clamp connector incorporating a leadscrew according to claim 1, said connector including a torque link to prevent relative rotation between said first housing portion and said second housing portion.

3. A sub-sea clamp connector as claimed in claim 2 comprises three or more pivotally interconnected clamping sectors mounted by pin and slot connections on a single guide plate.

4. A sub-sea clamp connector as claimed in claim 3 including a guide funnel comprising a plurality of funnel segments each attached to a corresponding clamping sector.

5. A sub-sea clamp connector as claimed in claim 2 in which both said threaded portions are immersed in an oil bath the pressure within which is equalised with the pressure in the sea at the working depth.

6. A sub-sea clamp connector as claimed in claim 5 in which the oil bath includes a flexible expansion envelope the external surface of which in use is exposed to the pressure of the sea at the working depth.

7. A sub-sea clamp connector according to claim 2, in which said first and second housing portions are provided with mating members of non-circular cross section, so that said first portion cannot rotate relative to said second housing portion.

8. A sub-sea clamp connector according to claim 7, wherein said mating members are in the form of splines and grooves.

* * * * *